(12) United States Patent
Zhu et al.

(10) Patent No.: US 12,199,298 B2
(45) Date of Patent: Jan. 14, 2025

(54) BATTERY ENERGY STORAGE MODULE AND BATTERY ENERGY STORAGE DEVICE

(71) Applicant: SAIC MOTOR CORPORATION LIMITED, Shanghai (CN)

(72) Inventors: Jun Zhu, Shanghai (CN); Kewei Lu, Shanghai (CN); Dingxian Zhou, Shanghai (CN); Haiping Chen, Shanghai (CN); Shuyuan Liu, Shanghai (CN); Zhao Li, Shanghai (CN); Yaqi Chen, Shanghai (CN); Xunwen Cao, Shanghai (CN); Fengyi Chen, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 485 days.

(21) Appl. No.: 17/776,347

(22) PCT Filed: Nov. 12, 2019

(86) PCT No.: PCT/CN2019/117492
§ 371 (c)(1),
(2) Date: May 12, 2022

(87) PCT Pub. No.: WO2021/092754
PCT Pub. Date: May 20, 2021

(65) Prior Publication Data
US 2022/0399605 A1    Dec. 15, 2022

(51) Int. Cl.
*H01M 50/242* (2021.01)
*H01M 10/42* (2006.01)
(Continued)

(52) U.S. Cl.
CPC ....... *H01M 50/242* (2021.01); *H01M 10/425* (2013.01); *H01M 10/482* (2013.01);
(Continued)

(58) Field of Classification Search
CPC ............. H01M 10/482; H01M 10/425; H01M 10/656; H01M 10/613; H01M 50/242; H01M 50/264; H01M 50/271
See application file for complete search history.

(56) References Cited

U.S. PATENT DOCUMENTS

2019/0267684 A1    8/2019   Ryu

FOREIGN PATENT DOCUMENTS

| CN | 103000835 A | 3/2013 |
| CN | 206947403 U | 1/2018 |

(Continued)

OTHER PUBLICATIONS

Japanese Notice of Reasons for Refusal dated May 29, 2023 (pp. 6).
(Continued)

*Primary Examiner* — Sarah A. Slifka
(74) *Attorney, Agent, or Firm* — NIXON PEABODY LLP (57) ABSTRACT

A battery energy storage module and a battery energy storage device. The battery energy storage module comprises: a structure body (101), a support member (102), and a cell group (103). A cavity for accommodating the cell group (103) is formed inside the structure body (101). The structure body (101) is provided with an opening. The cell group (103) is disposed in the cavity of the structure body (101) through the opening of the structure body (101). The support member (102) is used for supporting the structure body (101) to protect the cell group (103) disposed in the cavity of the structure body (101). Because the support member (102) is used for supporting the structure body (101) to protect the cell group (103) disposed in the cavity of the structure body (101), the battery energy storage module can have strong impact resistance, and can be applied to a full vehicle environment alone without being disposed in a protection tray.

14 Claims, 8 Drawing Sheets

(51) Int. Cl.
  *H01M 10/48* (2006.01)
  *H01M 10/613* (2014.01)
  *H01M 10/625* (2014.01)
  *H01M 10/656* (2014.01)
  *H01M 50/249* (2021.01)
  *H01M 50/264* (2021.01)
  *H01M 50/271* (2021.01)

(52) U.S. Cl.
  CPC ....... *H01M 10/613* (2015.04); *H01M 10/656* (2015.04); *H01M 50/264* (2021.01); *H01M 50/271* (2021.01); *H01M 2010/4271* (2013.01); *H01M 10/625* (2015.04); *H01M 50/249* (2021.01); *H01M 2220/20* (2013.01)

(56) References Cited

FOREIGN PATENT DOCUMENTS

| | | |
|---|---|---|
| CN | 207800719 U | 8/2018 |
| CN | 207896170 U | 9/2018 |
| CN | 110235273 A | 9/2019 |
| JP | 2003346924 A | 12/2003 |
| JP | 2014099257 A | 5/2014 |
| WO | 2012133709 A1 | 10/2012 |
| WO | 2019177275 A1 | 9/2019 |

OTHER PUBLICATIONS

Extended European Search Report in EP Application No. 199522673 mailed Jul. 17, 2023; 9 pp.
PCT International Search Report in International Application No. PCT/CN2019/117492, mailed Jul. 16, 2020.

Fig.9 in series connection in parallel connection

Fig. 10

BATTERY ENERGY STORAGE MODULE AND BATTERY ENERGY STORAGE DEVICE

CROSS-REFERENCE TO RELATED APPLICATIONS

This application is the United States National Phase of International Application No.: PCT/CN2019/117492, filed Nov. 12, 2019, the entire contents of which are herein incorporated by reference in their entirety.

TECHNICAL FIELD

This application with its embodiments relates to batteries, and in particular, to battery energy storage modules and battery energy storage devices.

BACKGROUND

With continuous increase in the demand for on-board power of various new energy vehicles and the development of the battery energy storage industry, the energy density of various batteries represented by lithium-ion batteries is being continuously improved. This put higher requirements to the safety, cost and power integration efficiency and other aspects. Accordingly, the battery energy storage device needs more parts and components, and more complicated assembly.

SUMMARY

At least for at least the above reasons, the technical problem solved by the present application is providing a battery energy storage module and a battery energy storage device for at least overcoming the above problems.

At the first aspect, the present application provides a battery energy storage module comprising: a structure body, a support and a cell set; wherein a chamber for receiving the cell set is formed inside the structure body, and the structure body is provided with an opening; wherein the cell set is placed in the chamber of the structure body through the opening of the structure body; and wherein the support is used for supporting the structure body to protect the cell set placed in the chamber of the structure body.

Optionally, in an embodiment of the present application, the support is a part of the structure body or is disposed on an outer wall of the structure body.

Optionally, in an embodiment of the present application, the structure body and the support are formed integrally or formed separately and then assembled together.

Optionally, in an embodiment of the present application, the structure body further includes a partition beam, and the partition beam partitions the chamber of the structure body into at least one sub-chamber for receiving at least one of the cell sets.

Optionally, in an embodiment of the present application, the support and/or the partition beam is a chamber structure including at least one sub-chamber.

Optionally, in an embodiment of the present application, the chamber structure includes a thermal management medium channel therein for receiving a thermal management medium for cooling the cell set.

Optionally, in an embodiment of the present application, the chamber of the structure body includes a thermal management medium channel for receiving a thermal management medium for cooling the cell set.

Optionally, in an embodiment of the present application, the battery energy storage module further comprising an end plate, wherein the end plate and the structure body together seal the cell set in the chamber of the structure body.

Optionally, in an embodiment of the present application, opposite sides of the structure body are each formed with an opening where a corresponding end plate is arranged.

Optionally, in an embodiment of the present application, at least one external interface is provided on the end plate or the structure body, and the external interface is configured for external device connection.

Optionally, in an embodiment of the present application, the cell set comprises at least one cell and constraining bodies; and constraining bodies are disposed at both ends of the cell set to constrain the at least one cell.

Optionally, in an embodiment of the present application, the cell set further comprises a constraining strip being fixedly connected with the constraining body and constraining and/or guiding the cells.

Optionally, in an embodiment of the present application, the cell set further comprises a signal-collecting assembly electrically connected to the cell.

Optionally, in an embodiment of the present application, the battery energy storage module further comprising a cell-monitoring unit being electrically connected to the cell set or located on the cell of the cell set.

Optionally, in an embodiment of the present application, the battery energy storage module further comprising an electrical control unit being electrically connected to the cell set or located on the cell of the cell set.

Optionally, in an embodiment of the present application, the structure body or the end plate of the battery energy storage module is provided with a pressure relief valve for discharging fumes.

At the second aspect, the present application provides a battery energy storage device comprising at least one battery energy storage module of the above.

Optionally, in an embodiment of the present application, the battery energy storage modules are connected to each other in parallel or in series manner.

The battery energy storage module and the battery energy storage device according to the present application utilize the chamber inside the structure body to receive the cell set. The support is used to support the structure body to protect the cell set in the chamber placed in the structure body, thus the battery energy storage module has strong impact resistance, and can be used in a whole-vehicle environment alone without being arranged in a protective tray.

BRIEF DESCRIPTION OF THE DRAWINGS

Hereinafter, some specific embodiments of the present application will be described in detail by way of example but not a limitation with reference to the accompanying drawings. The same reference numbers in the figures designate the same or similar parts or components. It will be understood by those skilled in the art that the drawings are not necessarily to scale. In the attached figures.

REFERENCE SIGNS battery energy storage module 10;
structure body 101;
support 102;
cell set 103;
partition beam 1011;
cell 1031;
constraining end plate 1032;
elastic component 1033;
slide rail 1034;
signal-collecting assembly 1035;
end plate 104;
external interface 1041;
cell-monitoring unit 105;
electrical control unit 106.

DETAILED DESCRIPTION

Implementations of any technical solution of the embodiments of the present application does not necessarily need to achieve all the above advantages at the same time.

In order to make those skilled in the art better understand the technical solutions in the embodiments of the present application, the technical solutions in the embodiments of the present application will be described clearly and completely below with the accompanying drawings. The described embodiments are only part of the embodiments of the present application, rather than all the embodiments of the present application. All other embodiments obtained by skilled in the art based on the embodiments of the present application should fall within the protection scope of the present application.

In one implementation, the battery energy storage device is integrated with three architecture levels of cells, modules, and packs, and relatively independent functions are achieved through relatively independent components. For example, relatively independent structure parts are used to provide the functions carried by the entire battery energy storage device; relatively independent battery module parts are used to integrate a certain number of cells; cold plates are used to provide cooling functions, etc. Such a battery energy storage device has many architecture levels, a large number of parts, a variety of processes, a complex structure, which lead to low integration efficiency, high cost, and potential safety hazards.

In another implementation, the battery module level is weakened or even eliminated, and the pack is directly integrated with the cells. For example, the cells are directly fixed to the cold plate or other structure parts by adhesive. This battery energy storage device also achieves relatively independent functions through relatively independent components. For example, there are still relatively independent components such as trays, cold plates, and upper covers in the battery energy storage device. The improvement of integration efficiency is limited, and the process is relatively complex. The number of parts is also relatively large, and there are many cells in one pack, all of which are placed together. If thermal runaway occurs in one cell, it will spread to other cells, posing a great safety hazard.

Moreover, in the above two implementation methods, power of the battery energy storage device is relatively fixed, and it is difficult for product design to achieve space and later expansion. When the usage scenarios change the physical boundaries and power requirements of battery energy storage devices, it is difficult to achieve flexible matching and usually need redeveloping. However, development usually takes long time and its cost is high.

The specific implementation of the embodiments of the present application will be further described below with reference to the accompanying drawings of the embodiments of the present application.

Figure 1A:
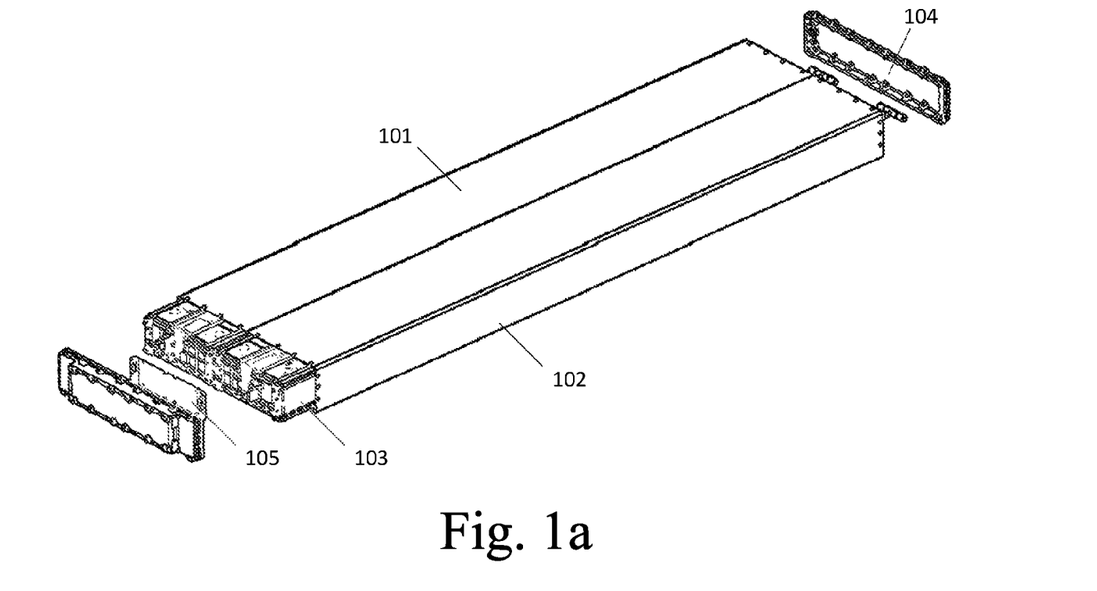
FIG. 1a and FIG. 1B are schematic diagrams of the structure of a battery energy storage module provided by an embodiment of the application.
Figure 1B:
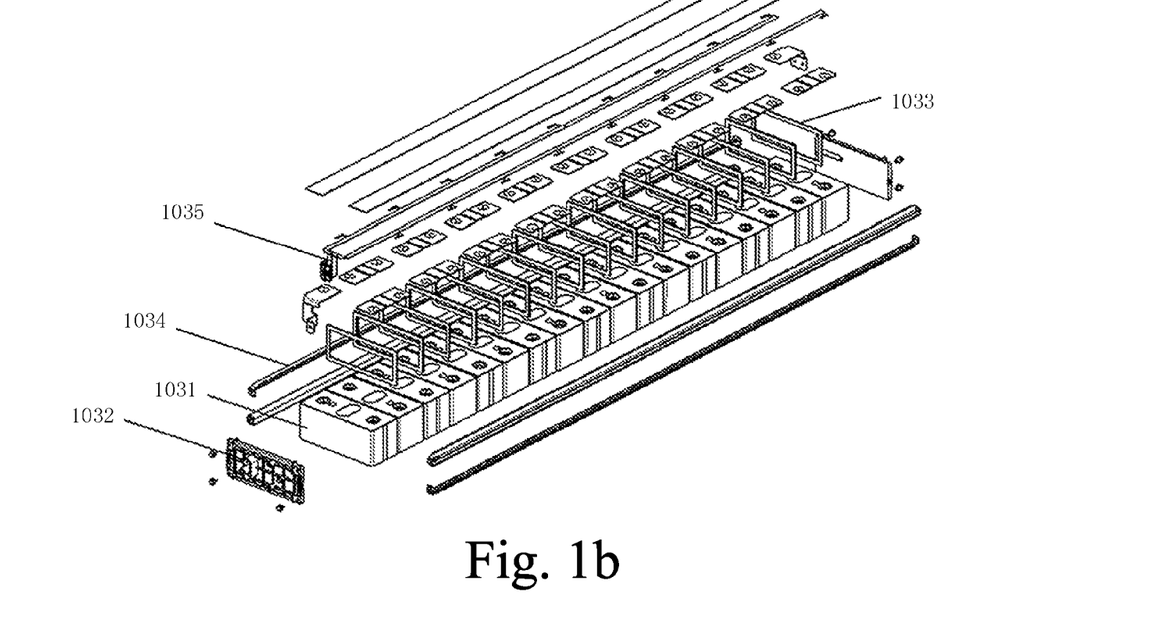

FIGS. 1a and 1b are schematic diagrams of a battery energy storage module provided in an embodiment of the application. As shown in FIGS. 1a and 1b, the battery energy storage module 10 includes: a structure body 101, a support 102, and a cell set 103;

A chamber for receiving the cell set 103 is formed inside the structure body 101, and the structure body 101 is provided with an opening;

The cell set 103 is placed in the chamber of the structure body 101 through the opening of the structure body 101;

The support 102 is used to support the structure body 101 to protect the cell set 103 placed in the chamber of the structure body 101.

The battery energy storage module and the battery energy storage device of the embodiments of the present application utilize the chamber inside the structure body to receive the cell set, and utilize the support to support the structure body to protect the chamber space placed in the structure body. Thus, the battery energy storage module has a strong impact resistance, and can be used in a whole vehicle environment independently without being arranged in a protective tray.

Optionally, referring to FIGS. 2a-2g, the support 102 is a part of the structure body 101 or is disposed on any outer wall of the structure body 101.

The support 102 in the present application is a part of the structure body 101. The support 102 and other parts of the structure body 101 together form the chamber for receiving the cell set 103, such that with the support 102 the impact resistance of the chamber is increased.

As examples, the combinations of the support 102 and the structure body 101 are illustrated with FIGS. 2a-2g.

Figure 2A:
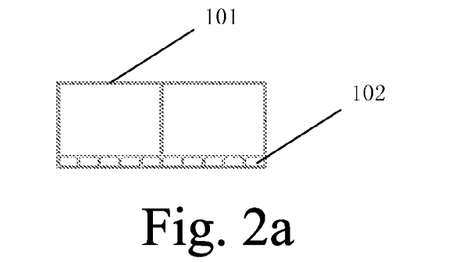
FIG. 2a-FIG. 2g are schematic diagrams of longitudinal cross-section of a structure body provided by the embodiment of the application.

FIG. 2a shows that the structure body 101 and the support 102 together form the chamber, and the two are assembled. The other side walls of the structure body 101 are integral structures, and the bottom is open to the support 102 for assembling.

Figure 2B:
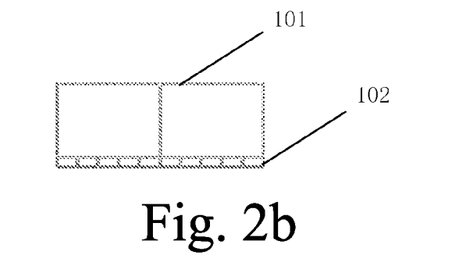

FIG. 2b shows that the structure body 101 and the support 102 together form the chamber, and the two are assembled. The structure body 101 has a T-shaped integral structure, and two ends are realized as detachable opening end plates, The bottom opening is for being assembled with the support 102.

Figure 2C:
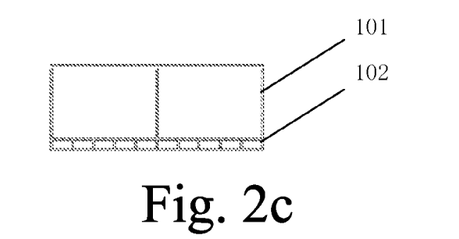

FIG. 2c shows that the structure body 101 and the support 102 together form the chamber, the structure body 101 and the support 102 together are an integral structure, and the upper part of the structure body 101 is a detachable opening end plate.

Figure 2D:
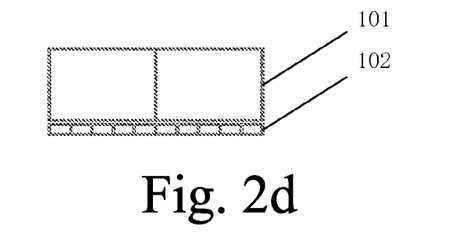

FIG. 2*d* shows that the structure body 101 and the support 102 are separate structures. The structure body 101 and the support 102 are respectively an integral structure, and the support 102 is located on the bottom side of the structure body 101.

Figure 2E:
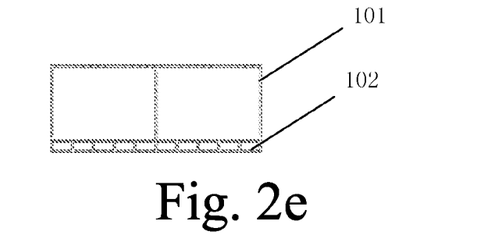

FIG. 2*e* shows that the structure body 101 and the support 102 together form the chamber. The structure body 101 is only realized as an outer wall, and the bottom opening and the middle partition plate are assembled with the support 102.

Figure 2F:
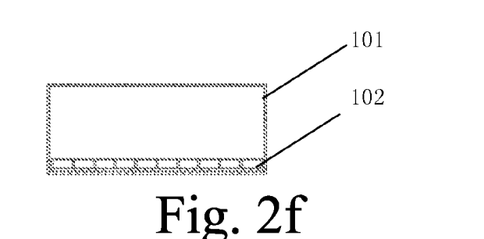

FIG. 2*f* shows that the structure body 101 forms the chamber, and the support 102 is placed at the bottom of the structure body 101.

Figure 2G:
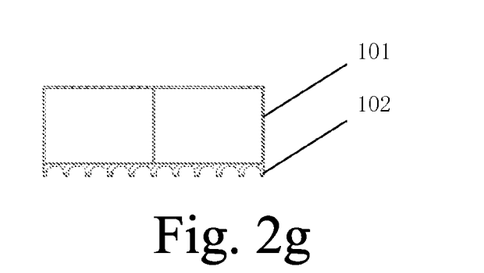

FIG. 2*g* shows that the structure body 101 and the support 102 together form the chamber. The structure body 101 and the support 102 together are an integral structure, and the support 102 is realized as a support entity which has grooves at the bottom.

The support 102 in the present application is disposed on any outer wall of the structure body 101, such that the support 102 and the structure body 101 can jointly increase the impact resistance of the chamber.

Specifically, the structure body 101 and the support 102 are formed integrally or formed separately and then assembled together.

The structure body 101 and the support 102 being integrally formed reduces the complexity of the manufacturing process, reduces the number of parts, and improves the stability of the structure. For example, a typical implementing way is integral molding through a metal extrusion process. This process needs a small number of parts, and has good overall structural strength and low cost.

The structure body 101 and the support 102 being assembled leaves the structure body 101 and the support 102 can be manufactured separately, providing flexibility in the production process. For example, they can be combined as a whole by welding, bolt connecting, etc., which is not limited in this application.

Figure 3:
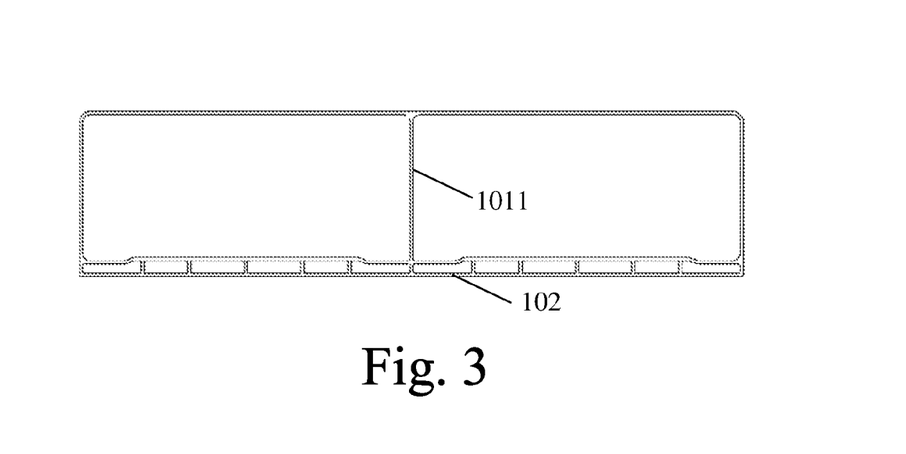
FIG. 3 is a schematic diagram of a structure body provided by an embodiment of the application.

FIG. 3 is a schematic diagram of a structure body provided by an embodiment of the application. As shown in FIG. 3, optionally, in an embodiment of the application, the structure body 101 further includes a partition beam 1011. The partition beam 1011 partitions the chamber of the structure body 101 into at least one sub-chamber, and each sub-chamber may receive at least one cell set 103.

Optionally, in an embodiment of the present application, the support 102 and/or the partition beam 1011 is a chamber structure including at least one sub-chamber.

Figure 4:
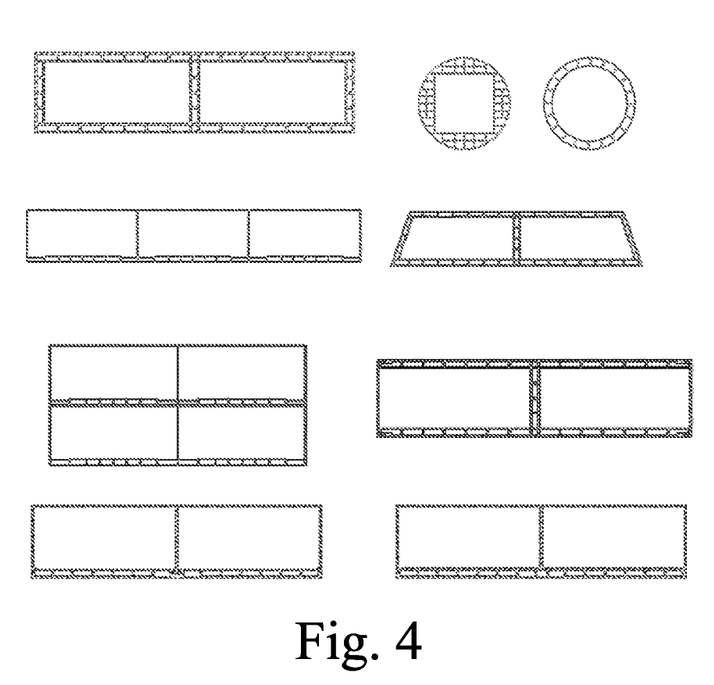
FIG. 4 is a schematic diagram of a chamber structure of the application.

The chamber structure functions for protecting and buffering, which increases the strength and a buffer area of the structure body 101 against external impacts, which is beneficial to protect the cell set 103 in the internal chamber of the structure body 101. As shown in FIG. 4, the chamber structure of the support 102 is shown. In FIG. 4, it can also be observed that there may be at least one chamber inside the structure body 101. For example, the chamber inside the structure body 101 may be one chamber; it may be two chambers side by side; it may also be three chambers side by side; it may also be four chambers, with two rows up and down and two chambers in each row. Of course, this is only an exemplary description, which does not mean that the present application is limited to this.

The chamber of the structure body 101 may be cylindrical, and the cross-section of the chamber (i.e., the longitudinal cross-sectional pattern of the inner wall of the structure body 101) may be circular, rectangular, body-shaped, etc., which is not limited in this application. The longitudinal cross-sectional pattern of the outer wall of the structure body 101 may be the same as or different from the longitudinal cross-sectional pattern of the inner wall.

Optionally, in an embodiment of the present application, the chamber structure includes a thermal management medium channel. The thermal management medium channel is used for receiving a thermal management medium for cooling the cell set 103. The thermal management medium channel may be sealed, as well as be communicated with external thermal management components through a thermal management interface on the structure body 101.

The chamber structure can not only protect the cell set 103 and increase the buffer area, but also receive the thermal management medium for cooling down the cell set 103. This configuration utilizes protecting function and cooling function integrated in the structure main body 101. The realization of the chamber structure eliminates the need of separate protective components and thermal management components, further reducing the number of components, facilitating manufacturing convenience and improving structural stability.

Optionally, in another embodiment of the present application, the chamber of the structure body 101 includes a thermal management medium channel. The thermal management medium channel is used for receiving a thermal management medium for cooling the cell set.

Figure 5:
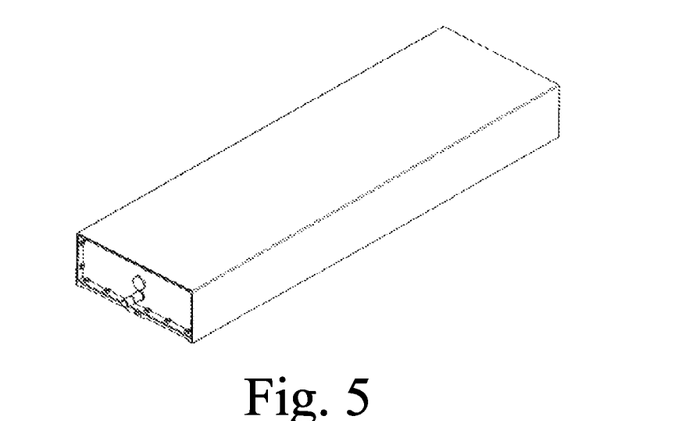
FIG. 5 is a schematic diagram of the chamber structure of the application being immersion cooling.

In the case that the chamber of the structure body 101 is a sealed chamber, optionally, referring to FIG. 5, the chamber is used as the thermal management medium channel through which a thermal management medium for cooling the cell set is injected. This forms immersion cooling. The thermal management medium is a cooling liquid or a phase-changing material. The chamber volume of the structure body 101 is able to meet the requirements of immersion cooling, and the cost is low and the reliability is high.

Optionally, in an embodiment of the present application, the present application further includes: an end plate 104. The end plate 104 and the structure body 101 together seal the cell set 103 inside the chamber of the structure body 101.

Specifically, for example, the structure body 101 is elongated. Openings of the structure body 101 are provided at both ends of the structure body 101. The structure body 101 may have two openings or one opening.

The openings of the structure body 101 are provided at both ends of the structure body 101. The end plates 104 are connected to the openings of the structure body 101. Therefore, the size of the part that needs to be sealed between the end plate 104 and the structure body 101 is small and easy to seal with better sealing effect. Moreover, the battery energy storage module 10 only receives the cell set 103, and the size is much smaller than that of the conventional battery energy storage device. Therefore, the sealing performance will be further improved compared with conventional battery energy storage devices.

Figure 6:
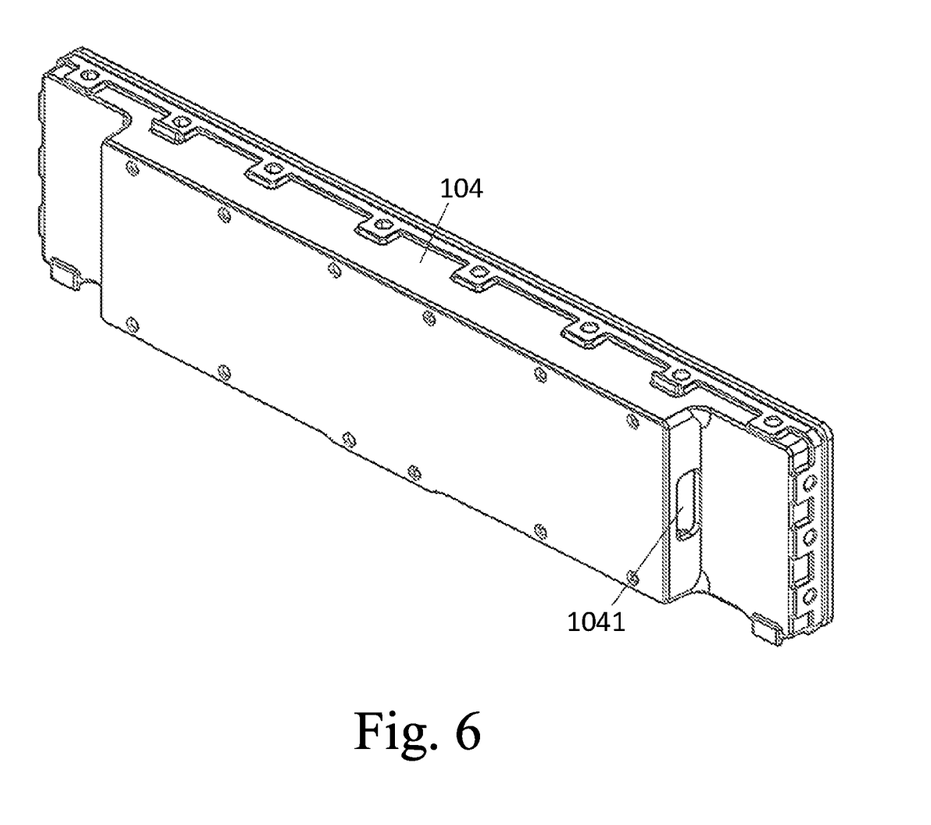
FIG. 6 is a schematic diagram of an end plate provided by an embodiment of the application.

FIG. 6 is a schematic diagram of an end plate provided by an embodiment of the present application. As shown in FIG. 6, optionally, in an embodiment of the present application, the end plate 104 is provided with at least one external interface 1041. The external interface 1041 is used to connect external devices.

The external interface 1041 may include an electrical external interface, a thermal management interface, a mechanical external interface, etc. A maintenance window for maintaining may also be provided on the end plate 104.

The electrical external interface may be connected to electrical components, the thermal management external interface may be connected to thermal management components, and the mechanical external interface may be connected to mechanical components.

The end plate 104 may provide a constraining force to the cell set 103, constraining the positioning of the cell set 103 within the chamber of the structure body 101.

Referring to FIG. 1B, optionally, in any embodiment of the present application, the cell set 103 includes at least one cell 1031 and a constraining body 1032.

A cell refers to a single electrochemical unit containing positive and negative electrodes. Cells can be divided into aluminum-shell cells, soft-wrapped cells (also known as "polymer cells"), cylindrical cells, etc. In this application, the definition of a cell is not limited, as long as it is an electrochemical cell with positive and negative electrodes.

Constraining bodies 1032 are arranged at both ends of the cell set 103 to constrain the cells 1031.

Optionally, elastic components 1033 are arranged between the cells. The elastic components 1033 may reduce friction between the cells 1031 and protect the cells 1031.

Optionally, in any embodiment of the present application, as shown in FIG. 1b, the cell set 103 further includes a constraining strip 1034. The constraining strip 1034 is fixedly connected to the constraining body 1032 and constrains the cells 1031. The constraining strip 1034 may be provided with protrusions to reduce the frictional force when the cell set 103 is pushed into the chamber of the structure body 101. A coating may also be sprayed on the surface of the constraining strip 1034 to reduce the friction coefficient. A special shape can also be made on the constraining strip 1034 to receive other polymer materials. This can be used as the contact surface when the cell set 103 is pushed in. There are many methods to reduce the friction between the constraining strip 1034 and the inner wall of the structure body 101. This is not limited in the present application. For example, the inner wall of the structure body 101 may also be sprayed with a coating. The assembly of the cell set 103 and the structure body 101 depends on the structure of the structure body 101. In the case that the structure body 101 is integrally formed, the cell set 103 may be pushed into the opening of the structure body 101.

Optionally, in any embodiment of the present application, as shown in FIG. 1b, the cell set 103 further includes a signal-collecting assembly 1035. The signal-collecting assembly 1035 is electrically connected to the cell 1031. The signal-collecting assembly 1035 may monitor the cell 1031, and emit a signal alarm when the cell 1031 experiences abnormal conditions such as thermal runaway.

Optionally, in any embodiment of the present application, as shown in FIG. 1, the battery energy storage module 10 further includes a cell-monitoring unit 105. The cell-monitoring unit 105 is electrically connected to the cell set or located on the cells of the cell set. The cell-monitoring unit 105 may be a microcontroller unit (MCU).

Figure 7:
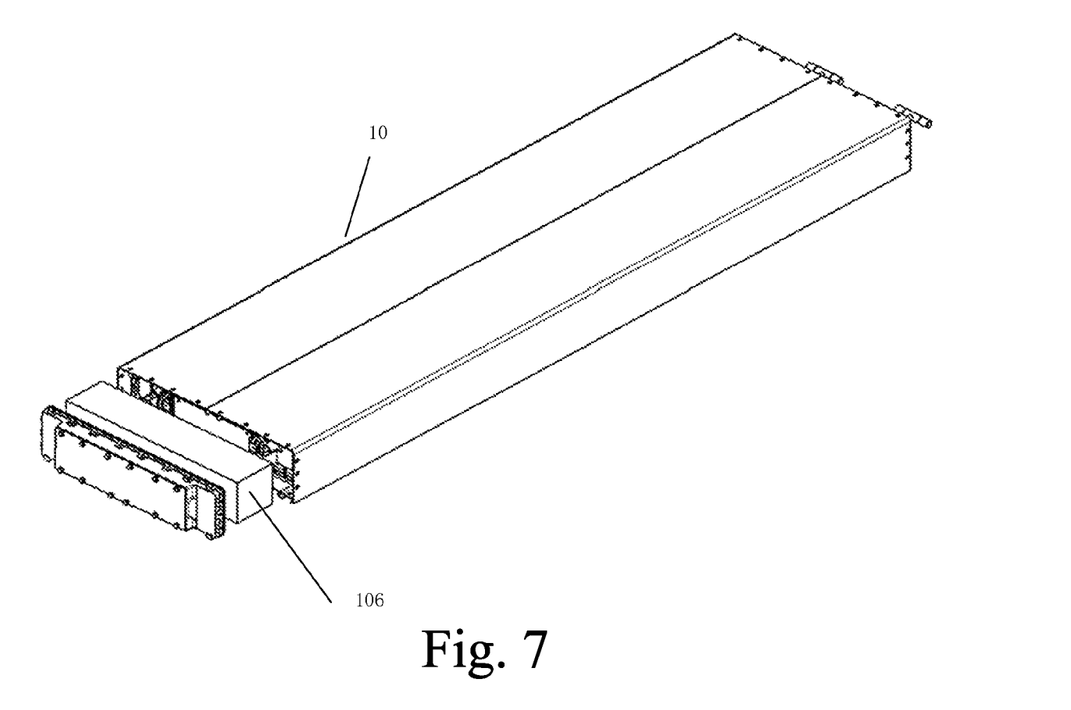
FIG. 7 is a schematic diagram of a battery energy storage module provided by an embodiment of the application.

Optionally, in any embodiment of the present application, as shown in FIG. 7, the battery energy storage module 10 further includes an electrical control unit 106. The electrical control unit 106 is electrically connected to the cell set or located on the cells of the cell set.

It should be noted that other functional modules may also be in a form similar to the cell set 103 and pushed into the structure body 101, such that the battery energy storage module 10 has extended functions. For example, as shown in FIG. 7, a battery control module may be pushed into the chamber of the structure body 101 through the opening of the structure body 101, and the battery control module may be electrically connected with the cell set 103.

The battery energy storage module 10 of an embodiment of the present application receives the cell set with the chamber inside the structure body 101. As the openings are at both ends of the structure body 101, at the openings the end plate 102 and the structure body 101 are sealed with smaller size. It is easier to achieve in process, and the sealing effect is better.

Another Example

Based on the battery energy storage module described above, an embodiment of the present application provides a battery energy storage device, which includes at least two battery energy storage modules 10. The battery energy storage modules 10 are the battery energy storage modules 10 described in the first aspect or any embodiment of the first aspect.

Optionally, in any embodiment of the present application, each of the battery energy storage modules 10 are connected in parallel or in series with each other.

Figure 8:
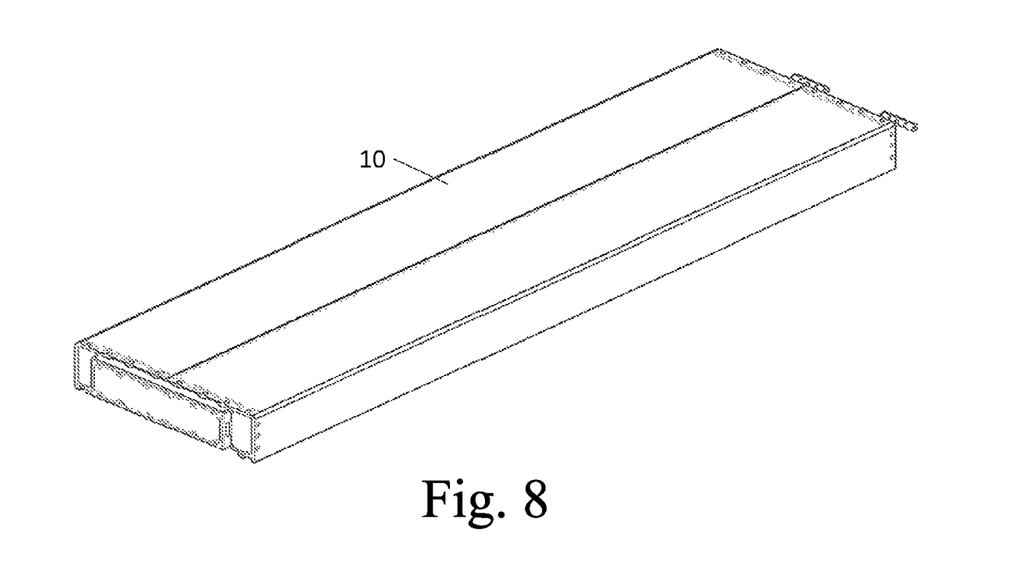
FIG. 8 is a perspective view of a battery energy storage module provided by an embodiment of the application.
Figure 9:
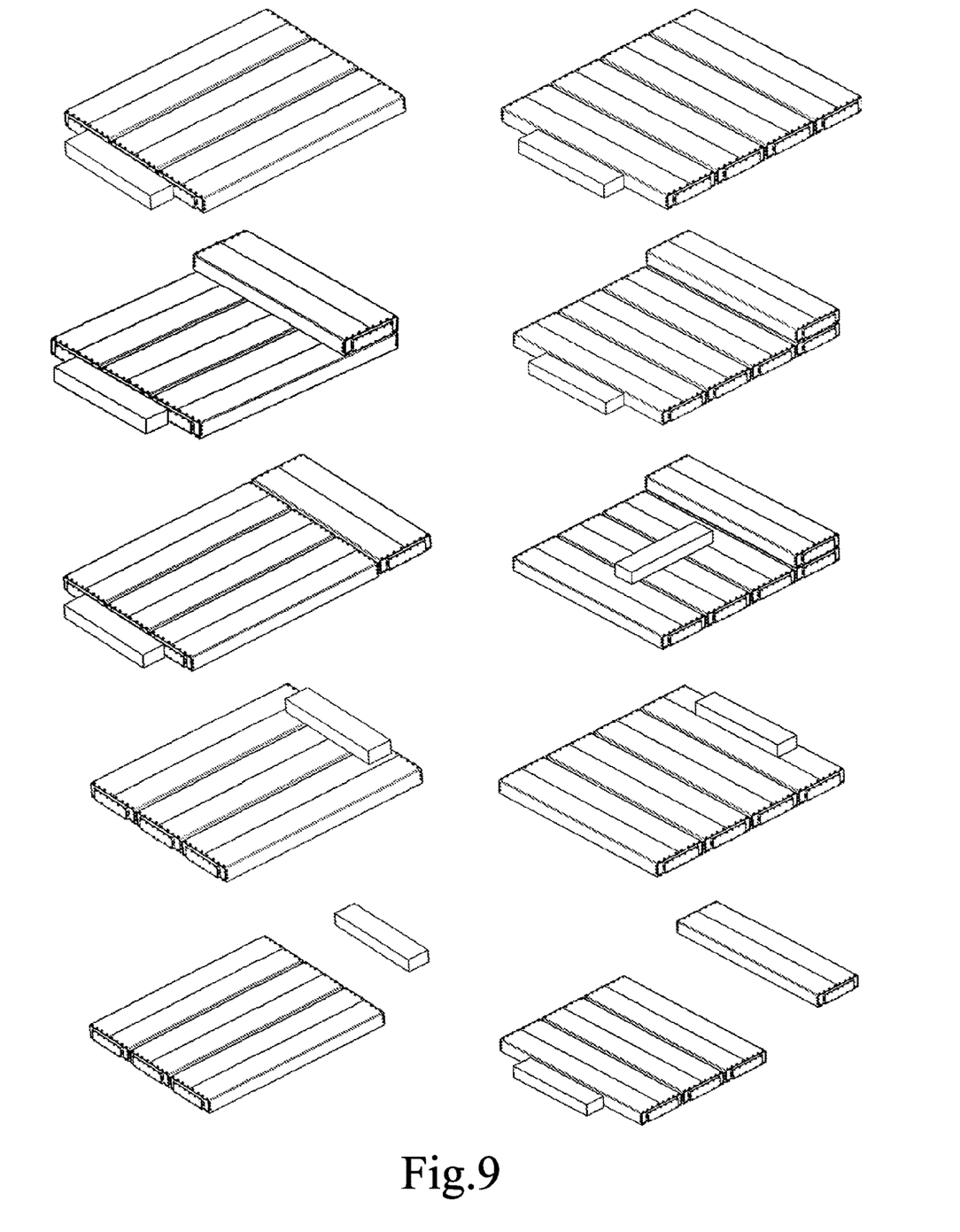
FIG. 9 is a schematic diagram of a combination mode of a battery energy storage module provided by an embodiment of the application.

As shown in FIG. 8, FIG. 8 showing a perspective view of a battery energy storage module provided by an embodiment of the application, the battery energy storage module 10 in the application may be used alone as a battery energy storage device. As an alternative, several modules may be used in combination with each other, or combined with other functional modules as a battery energy storage device. Flexibility of the physical form and function of the battery energy storage device is greatly improved, and it is easier to realize feasibility in different scenarios. As shown in FIG. 9, FIG. 9 is a schematic diagram of a combination manner of battery energy storage modules provided by embodiments of the application. Of course, FIG. 9 is only exemplary, which does not mean that the application is limited thereto.

In the case that several battery energy storage modules 10 are combined into a battery energy storage device, each battery energy storage module 10 may be independently transported and installed, reducing difficulty and cost of the supply chain and manufacture. When a module is abnormal, the module can be repaired or replaced independently, reducing maintenance time and cost.

Figure 10:
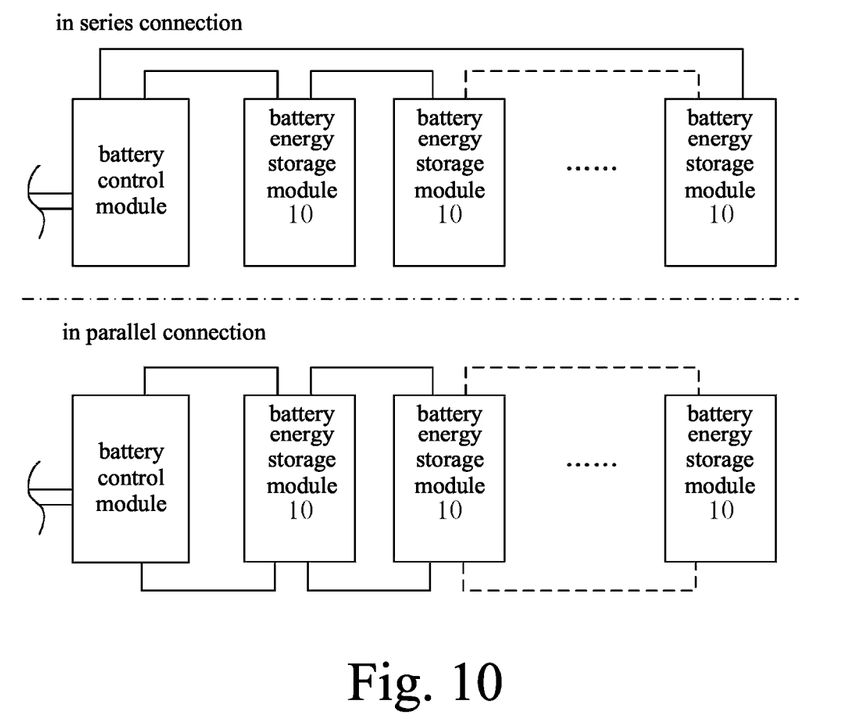
FIG. 10 is a schematic diagram of a connection relationship of a battery energy storage module according to an embodiment of the present application.

In the case that the battery energy storage modules 10 are connected in parallel to form a battery energy storage device, the number of the battery energy storage modules 10 can be flexibly increased or decreased according to the needs of specific scenarios. Of course, the battery energy storage modules 10 may also be connected in series, or may be combined in series and parallel connections, which is not limited in this application. As shown in FIG. 10, FIG. 10 is a schematic diagram of the connection relationship. Customers may also choose to increase or decrease the number of energy storage modules according to the actual power demand changes after purchasing.

Moreover, in the case that several battery energy storage modules 10 of the present application are combined into a battery energy storage device, the internal power of each battery energy storage module 10 is reduced, and the structures between respective battery energy storage modules 10 are relatively independent, which improves thermal runaway protection safety level.

Moreover, the battery energy storage module 10 in the solution of the present application can effectively resist the external impact on the cell set 103 with the support 102.

The battery energy storage device of embodiments of the present application uses the chamber inside the structure body to receive the cell set. With openings are at both ends of the structure body, the size that needs to be sealed between the end plate at the opening and the structure body is relatively small. This is easier to achieve in process, and the sealing effect is better.

The above product can execute the method provided by embodiments of the present application, and has corresponding functional modules and beneficial effects for executing the method. For technical details not described in detail in this embodiment, reference may be made to the methods provided in the embodiments of this application.

It should also be noted that the terms "comprising", "including" or any other variant thereof are intended to encompass non-exclusive inclusion, such that a process, method, product or device comprises a series of elements includes not only those mentioned elements, but also other elements that are not expressly listed or inherent to such a process, method, product or device. Without further limitation, an element qualified by the phrase "comprising a . . . " does not preclude the presence of additional identical elements in the process, method, product or device that includes the element.

Each embodiment in this specification is described in a progressive manner. The same or similar parts between the various embodiments can be referred to each other, and each embodiment focuses on the differences from others. In particular, for system embodiments, since they are basically similar to the method embodiments, the description is relatively brief, and for related parts, please refer to the partial descriptions of the method embodiments.

The above is only an embodiment of the present application, and is not intended to limit the present application. Various modifications and variations of this application are possible for those skilled in the art. Any modification, equivalent replacement, improvement, etc. made within the spirit and principle of this application shall be included within the scope of the claims of this application.

The invention claimed is:

1. A battery energy storage module comprising: a structure body, a support and a cell set;
    wherein a chamber for receiving the cell set is formed inside the structure body, and the structure body is provided with an opening;
    wherein the cell set is placed in the chamber of the structure body through the opening of the structure body; and
    wherein the support is a part of the structure body or is disposed on an outer wall of the structure body and is used for supporting the structure body to protect the cell set placed in the chamber of the structure body, and wherein the support is a chamber structure including at least one sub-chamber; and the chamber structure is configured to protect the cell set and increase a buffer area such that the battery energy storage module has an impact resistance strong enough that is able to be used in a whole vehicle environment independently without being arranged in a protective tray; and
    wherein the chamber of the structure body is used as a thermal management medium channel through which a thermal management medium for cooling the cell set is injected to form immersion cooling, the thermal management medium being a cooling liquid or a phase-changing material, such that the chamber integrated inside the structure body realize protecting function and cooling function at the same time without the addition of separate protecting assembly or thermal management assembly.

2. The battery energy storage module according to claim 1, wherein the structure body and the support are formed integrally or formed separately and then assembled together.

3. The battery energy storage module according to claim 2, wherein the structure body further includes a partition beam, and the partition beam partitions the chamber of the structure body into at least one sub-chamber for receiving at least one of the cell sets.

4. The battery energy storage module according to claim 1 further comprising an end plate, wherein the end plate and the structure body together seal the cell set in the chamber of the structure body.

5. The battery energy storage module according to claim 4, wherein opposite sides of the structure body are each formed with an opening where a corresponding end plate is arranged.

6. The battery energy storage module according to claim 4, wherein at least one external interface is provided on the end plate or the structure body, and the external interface is configured for external device connection.

7. The battery energy storage module according to claim 1, wherein the cell set comprises at least one cell, constraining bodies and a constraining strip; and
    constraining bodies are disposed at both ends of the cell set to constrain the at least one cell;
    the constraining strip is fixedly connected with the constraining body; and the cell set is pushed into the chamber of the structure body, the constraining strip constraining and guiding the cells, and the constraining strip being provided with protrusions or coating to reduce the frictional force between the constraining strip and the inner wall of the structure body.

8. The battery energy storage module according to claim 1, wherein the cell set further comprises a signal-collecting assembly electrically connected to the cell.

9. The battery energy storage module according to claim 1, further comprising a cell-monitoring unit being electrically connected to the cell set or located on the cell of the cell set.

10. The battery energy storage module according to claim 1, further comprising an electrical control unit being electrically connected to the cell set or located on the cell of the cell set.

11. A battery energy storage device comprising a battery energy storage module being independent usage or several battery storage modules for combination with each other usage according to claim 1.

12. The battery energy storage device according to claim 11, wherein the battery energy storage modules are connected to each other in parallel or in series manner.

13. The battery energy storage device according to claim 11, wherein the battery energy storage module being independent usage itself is used as the battery energy storage device.

14. The battery energy storage device according to claim 11, wherein several battery energy storage modules are composed as the battery energy storage device, and wherein each battery energy storage module is able to be transported and installed independently and able to be maintained or replaced independently.

* * * * *

UNITED STATES PATENT AND TRADEMARK OFFICE
CERTIFICATE OF CORRECTION

PATENT NO. : 12,199,298 B2
APPLICATION NO. : 17/776347
DATED : January 14, 2025
INVENTOR(S) : Jun Zhu et al.

Page 1 of 1

It is certified that error appears in the above-identified patent and that said Letters Patent is hereby corrected as shown below:

In the Specification

At Column 2, Line 60, please delete "FIG. 1B" and insert -- FIG.1b -- therefor.

Signed and Sealed this
Eighteenth Day of February, 2025

Coke Morgan Stewart
*Acting Director of the United States Patent and Trademark Office*